(12) United States Patent
Enning

(10) Patent No.: US 8,573,647 B2
(45) Date of Patent: Nov. 5, 2013

(54) VEHICLE WITH TRACTION BATTERY CAPABLE OF ABSORBING CRASH ENERGY

(75) Inventor: Norbert Enning, Denkendorf (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/878,385

(22) PCT Filed: Sep. 29, 2011

(86) PCT No.: PCT/EP2011/004854
§ 371 (c)(1),
(2), (4) Date: Apr. 8, 2013

(87) PCT Pub. No.: WO2012/045408
PCT Pub. Date: Apr. 12, 2012

(65) Prior Publication Data
US 2013/0199864 A1    Aug. 8, 2013

(30) Foreign Application Priority Data
Oct. 9, 2010 (DE) .......................... 10 2010 048 102

(51) Int. Cl.
*B62D 21/15* (2006.01)

(52) U.S. Cl.
USPC ........................... 280/784; 296/35.2; 180/232

(58) Field of Classification Search
USPC ................. 280/784; 180/271, 312, 311, 232; 296/35.2, 187.09, 187.11
See application file for complete search history.

(56) References Cited

U.S. PATENT DOCUMENTS

| | | | | |
|---|---|---|---|---|
| 4,216,839 A * | 8/1980 | Gould et al. | ................. | 180/65.1 |
| 4,267,895 A * | 5/1981 | Eggert, Jr. | ................... | 180/68.1 |
| 5,156,225 A * | 10/1992 | Murrin | ........................ | 180/65.1 |
| 5,685,599 A * | 11/1997 | Kitagawa | ...................... | 296/204 |
| 6,189,635 B1 * | 2/2001 | Schuler et al. | ................. | 180/68.5 |
| 6,547,020 B2 * | 4/2003 | Maus et al. | .................. | 180/68.5 |
| 6,722,696 B2 * | 4/2004 | Sonomura et al. | ............ | 280/784 |
| 6,827,168 B2 * | 12/2004 | Miyazaki | .................... | 180/68.5 |
| 7,137,466 B2 * | 11/2006 | Kawasaki et al. | ............. | 429/408 |
| 7,144,039 B2 * | 12/2006 | Kawasaki et al. | ............. | 280/784 |
| 7,232,002 B2 * | 6/2007 | Taya et al. | .................... | 180/274 |
| 7,466,102 B2 | 12/2008 | Andersson et al. | | |

(Continued)

FOREIGN PATENT DOCUMENTS

| | | |
|---|---|---|
| DE | 42 35 394 C1 | 10/1993 |
| DE | 43 31 900 A1 | 3/1994 |

(Continued)

OTHER PUBLICATIONS

International Search Report issued by the European Patent Office in International Application PCT/EP2011/004854.

*Primary Examiner* — Nicole Verley
(74) *Attorney, Agent, or Firm* — Henry M. Feiereisen LLC

(57) ABSTRACT

The invention relates to a vehicle having, at least in part, an electric drive which includes a traction battery (1), which vehicle has at least one predefined deformation zone (I, II) which in the event of a crash (A, B) acts to absorb energy, and at least one predefined zone (III), which has a substantial structural rigidity and which in the event of a crash (A, B) remains substantially without deformation. According to the invention, the traction battery (1) has a deformation region (18) which in the event of a crash can be deformed via a deformation path (a) and which is arranged in the deformation zone (I, II) of the vehicle.

12 Claims, 2 Drawing Sheets

(56) References Cited

U.S. PATENT DOCUMENTS

| | | | |
|---|---|---|---|
| 7,669,688 B2* | 3/2010 | Yamaguchi et al. | 180/312 |
| 7,726,429 B2* | 6/2010 | Suzuki | 180/232 |
| 7,886,861 B2* | 2/2011 | Nozaki et al. | 180/232 |
| 8,276,696 B2* | 10/2012 | Lucas | 180/68.2 |
| 8,393,427 B2* | 3/2013 | Rawlinson | 180/68.5 |
| 2006/0076800 A1* | 4/2006 | Pierce et al. | 296/187.11 |
| 2007/0145098 A1 | 6/2007 | Lee et al. | |
| 2008/0078603 A1* | 4/2008 | Taji et al. | 180/312 |
| 2009/0226806 A1 | 9/2009 | Kiya | |
| 2011/0083923 A1* | 4/2011 | Ajisaka | 180/291 |
| 2011/0162902 A1* | 7/2011 | Dobbins et al. | 180/68.5 |
| 2013/0092457 A1* | 4/2013 | Wecker et al. | 180/2.2 |

FOREIGN PATENT DOCUMENTS

| | | |
|---|---|---|
| DE | 100 61 643 A1 | 6/2002 |
| DE | 10 2005 054 435 A1 | 5/2006 |
| DE | 10 2007 021 293 A1 | 11/2008 |
| DE | 11 2007 000 474 T5 | 1/2009 |
| DE | 10 2008 010 822 A1 | 8/2009 |
| DE | 10 2008 010 829 A1 | 11/2009 |
| DE | 10 2008 059 973 A1 | 6/2010 |
| DE | 10 2009 006 991 A1 | 8/2010 |
| EP | 1 992 513 A1 | 2/2007 |
| JP | 2005-050616 A | 2/2005 |
| WO | WO 03/092088 A2 | 11/2003 |

* cited by examiner

VEHICLE WITH TRACTION BATTERY CAPABLE OF ABSORBING CRASH ENERGY

CROSS-REFERENCES TO RELATED APPLICATIONS

This application is the U.S. National Stage of International Application No. PCT/2011/004854, filed Sep. 29, 2011, which designated the United States and has been published as International Publication No. WO 2012/045408 and which claims the priority of German Patent Application, Serial No. 10 2010 048 102.5, filed Oct. 9, 2010, pursuant to 35 U.S.C. 119(a)-(d).

BACKGROUND OF THE INVENTION

The invention relates to a vehicle having at least in part an electric drive.

Traction batteries are used in hybrid vehicles or vehicles with pure electric drive and represent space-intensive structures which are arranged either in the front region or rear region of the vehicle and thus are exposed to high risk of deformation in the event of a crash.

To prevent destruction of the traction battery in the event of an accident, DE 10 2008 010 829 A1 discloses a generic vehicle having such a traction battery. The battery housing of the traction battery is divided into two interconnectable battery housing parts. Both battery housing parts are aligned with each other in such a way that the battery is protected overall against destruction in the event of a collision.

In order to ensure protection of occupants in the event of a crash, on one hand, and to ensure a substantial conversion of the impact energy into deformation work, on the other hand, modern motor vehicle are divided into deformation zones which act to absorb energy in the event of a crash, and into zones of high structural strength. Such a zone of high structural strength is, e.g., the body region located anteriorly of the pedals in travel direction. This body region is designed very rigid to prevent the pedals from becoming misaligned during collision that could pose a risk to the driver.

In the afore-mentioned prior art, the two housing parts of the battery housing are of such stable shape that, for reasons of protection against short-circuit and liquid tightness and gas tightness, the housing parts undergo almost no deformation. This requires, however, use of much material when designing the battery housing. In addition, the battery housing represents a simple block element that is not taken into account when designing a crumple zone to be provided for the vehicle.

SUMMARY OF THE INVENTION

The object of the invention is the provision of a vehicle with a traction battery to improve the crash performance in a simple manner.

The object is attained by a vehicle having at least in part an electric drive including a traction battery, the vehicle having at least a predefined deformation zone which acts to absorb energy in the event of a crash, and at least one predefined zone of high structural strength which in the event of a crash remains substantially without deformation, wherein the traction battery has a deformation region which is deformable along a deformation path in the event of a crash and is arranged in the deformation zone of the vehicle. Preferred refinements of the invention are set forth in the dependent claims.

In departure from the previously known design of a vehicle with traction battery, the structure stiffness of the traction battery has not been increased in accordance with the invention in order to prevent destruction of a battery, but the traction battery is specifically designed as a deformation element which can undergo a predefined deformation in the event of a crash and thereby is able to absorb impact energy. The traction battery has hereby in the event of a crash a deformable deformation region arranged in a predefined deformation zone of the vehicle. The traction battery is hereby designed to remain free of damage when undergoing a deformation along the deformation path.

The traction battery has a storage block for storing the electrical energy. The storage block can include a plurality of storage cells which work in particular electrochemically or galvanically and optionally are connected in series. The storage cells can be connected by electrically conductive contact elements with power supply lines of the vehicle.

The arrangement of the electrically conductive contact elements of the traction battery are of utmost importance to ensure protection against short-circuit in the event of a crash. Against this background, the contact elements of the traction battery cannot be arranged in a, vehicle zone designed as deformation zone, but rather in the zone of high structural stiffness. In contrast thereto, the storage block can form the deformation region of the traction battery in the event of a crash and can be arranged as such in a deformation zone of the vehicle.

In order to achieve a non-destructive deformation of the storage cells, the latter may be enclosed by an easily deformable, flexible and sheet-like envelope. There is no need to directly stack the individual storage cells in the storage block upon one another, but may be arranged in spaced-apart relationship at predefined clear deformation gaps. Air may flow through the clear deformation gaps during normal driving operation to effect a cooling of the storage cells.

The individual storage block comprised of individual storage cells can be enclosed in a battery housing in a gas-tight and liquid-tight manner to prevent a possible escape of harmful electrolysis liquid and/or gases from the traction battery in the event of a an accident. As opposed to the afore-mentioned prior art, the battery housing is not designed fixed in place or of stable shape, but rather made from an easily deformable material. Examples include a rubber-like, highly viscous sheath material which remains gas-tight and liquid-tight, even when undergoing substantial deformation, and has found application in fuel tank bubbles for example.

To further increase the protection against short-circuit, the electrically conductive terminals of the traction battery can be arranged on a battery side which faces away from a probable force introduction caused by a crash. In this case, the deformably designed storage cells are thus placed anteriorly of the safety-critical terminals in the force flow direction in the event of a crash. In this force flow direction, a further protective element, forming for instance a bulkhead or the like, may additionally be placed anteriorly of the traction battery to protect the deformable storage cells or the deformable battery housing from being pierced by sharp objects.

According to a further embodiment, the traction battery may be arranged directly in the front region of the vehicle and configured as a deformation element for crash absorption in a head-on collision. With respect to a protection against short-circuit, the deformable storage block is placed in this case anteriorly of the terminals of the traction battery in travel direction, whereas the terminals are arranged in confronting relationship in the horizontal direction in the rear of the vehicle. In the front region, due to structural conditions, the body portion between the two lateral suspension strut mounts is already designed of substantial rigidity. It is therefore preferred, when the terminals of the traction battery are positioned in the vehicle longitudinal direction approximately level with the suspension strut mounts in the front region of the vehicle.

As an alternative, the traction battery can also be arranged in the rear region of the vehicle and designed as a deformation element for crash absorption in the event of a rear-end impact. Correspondingly, the terminals of the traction battery may here also be arranged anteriorly of the storage block in travel direction. In the event of a rear-end collision, the rear bumper is therefore pressed initially against the deformable storage block, accompanied by a reduction of the kinetic impact energy.

BRIEF DESCRIPTION OF THE DRAWING

Two exemplary embodiments of the invention will now be described with reference to the accompanying figures.

It is shown in.

DETAILED DESCRIPTION OF PREFERRED EMBODIMENTS

Figure 1:
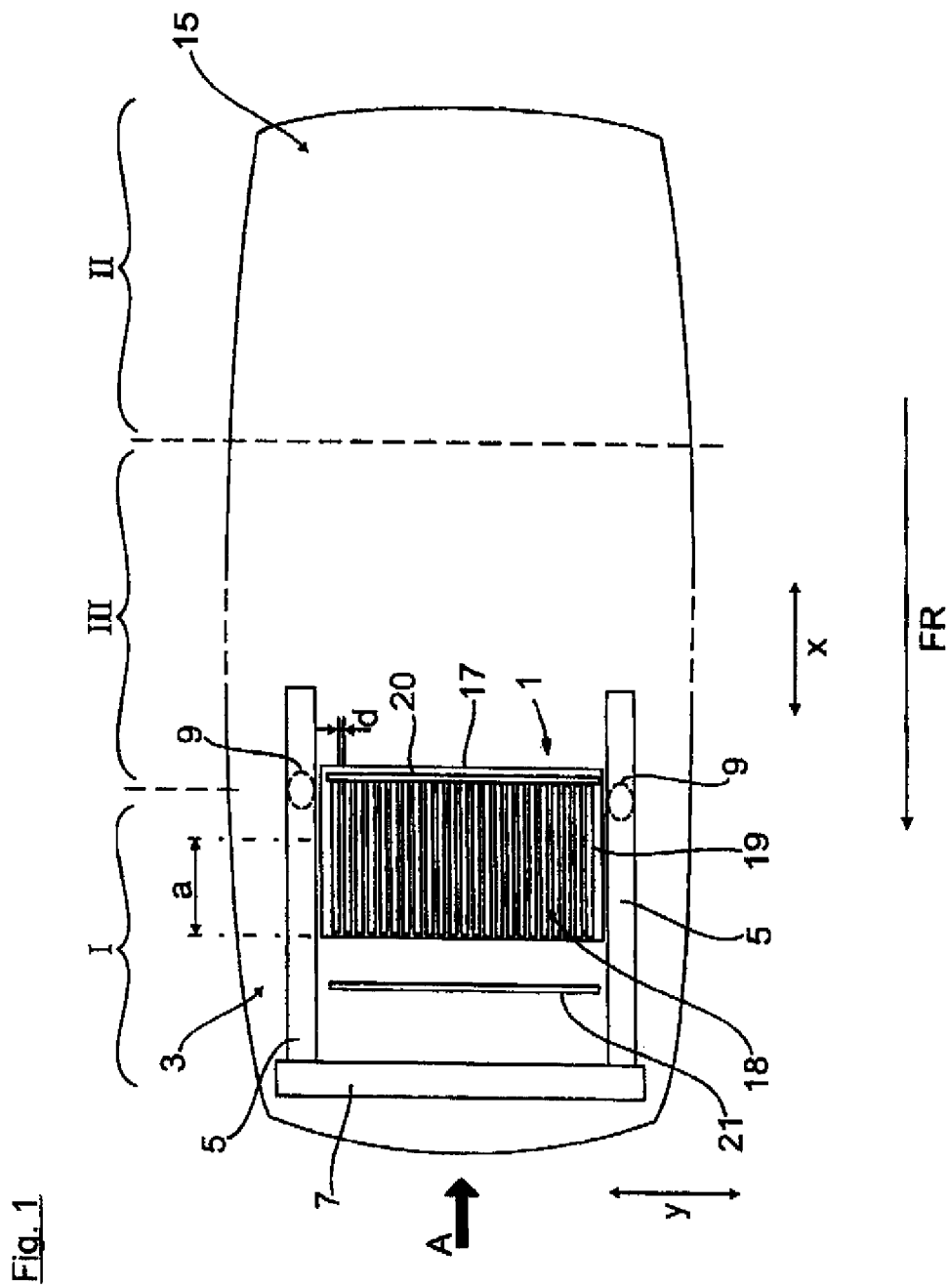
FIG. 1 a top view of the outer contour of a vehicle, depicting the arrangement of a traction battery for an electric drive system in the front region of the vehicle.

FIG. 1 shows a rough schematic depiction of a vehicle having a drive system provided with at least one electric machine, not shown, which is supplied with electric energy via a rechargeable traction battery 1. In FIG. 1, the traction battery 1 is arranged in the front region 3 of the motor vehicle. As further indicated in FIG. 1, two lateral longitudinal body beams 5 extend in the front region 3 and terminate at the forward vehicle end in a transversal extending bumper 7. Lateral suspension strut mounts 9 of the wheel suspensions of the front wheels 13 are respectively formed on both longitudinal beams 5 in the front region 3.

The vehicle is divided according to the FIG. 1 into different zones, that is a deformation zone I in the front region 3 as well as a deformation zone II in the rear region 15 and a zone III which is located between the two deformation zones I, II and has increased structural stiffness and in which also the passenger cell is situated. The deformation zones I, II and the zone III of high structural strength are designed to ensure occupant protection in the event of a head-on crash or a rear-end crash.

According to the FIG. 1, the traction battery 1 is arranged in the front region 3 in the vehicle transverse direction y between the two longitudinal beams 5. The driving battery 1 includes an outer battery housing 17 which surrounds a storage block 18 in a gas-tight and liquid-tight manner. The storage block 18 is comprised of a plurality of electrochemically working storage cells 19 which are connected in series and connected via electrically conductive contact elements 20 with not shown power supply lines of the vehicle. The individual storage cells 19 are designed deformably and are respectively surrounded by an easily deformable sheet-like envelope. Moreover, the individual storage cells 19 are arranged in spaced-apart relationship in the vehicle transverse direction y via clear deformation gaps d. The battery housing 17 is made, as is also the envelope of the individual storage cells, from an easily deformable material, such as a rubber-like sheath material.

According to FIG. 1, the terminals 20 are arranged on the traction battery 1 at a side which faces away from the front bumper 7. Moreover, the terminals 20 are located, as viewed in vehicle longitudinal direction x, level with the two outer suspension strut mounts 9, which are respectively located in the zone III of high structural strength. Conversely, the traction battery 1 protrudes with its storage block 18 into the deformation zone I of the front region 3. The storage block 18 of the traction battery 1 is designed as a deformation element which forms the front deformation zone I. For that purpose, the storage cells 19 with the deformation gaps d in-between are designed to ensure that the storage block 18 remains operable at least along a deformation path a and that the flexible battery housing 17 remains gas-tight and liquid-tight.

A further protection element 21 is arranged anteriorly of the traction battery 1 in the travel direction FR to protect the traction battery 1 from penetration of sharp objects in the event of a head-on crash A.

Figure 2:
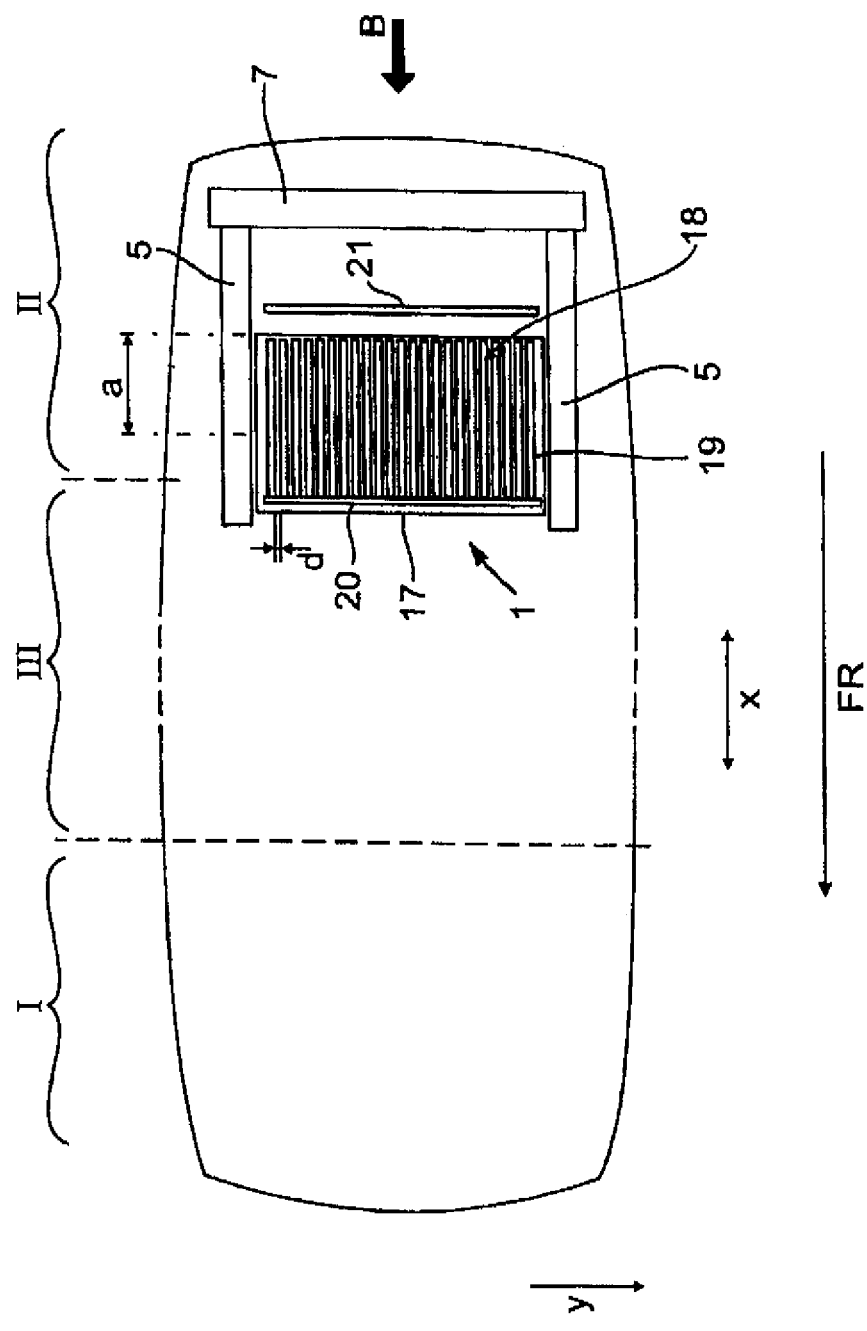
FIG. 2 is a view corresponding to FIG. 1 of a vehicle with a traction battery arranged in a rear region of the vehicle.

FIG. 2 shows a further exemplary embodiment in which the traction battery is arranged in the rear region 15 of the vehicle. The arrangement in FIG. 2 is a mirror image of the arrangement of FIG. 1. Accordingly, the traction battery is surrounded like a frame by a rear shock absorber 7 and by lateral longitudinal beams 5. With regard to a protection against short-circuit, critical terminals 20 of the traction battery 1 are protected in FIG. 2 in particular against a rear-end impact B. Accordingly, the terminals 20 of the traction battery 1 are arranged anteriorly of the storage block 18 in the travel direction F. A protection element 21 is also arranged between the rear bumper 7 and the traction battery for protecting the traction battery from penetration of sharp objects.

In FIG. 2, the terminals 20 are also no longer arranged in the deformation zone II of the rear region 15, but are already located in the highly rigid zone III of the vehicle.

What is claimed is:

1. A vehicle, comprising:
   a predefined first deformation zone which acts to absorb energy in the event of a crash,
   a predefined second zone exhibiting a structural strength which is greater than a structural strength of the deformation zone so as to be able to substantially withstand deformation in the event of the crash; and
   an electric drive having a traction battery, said traction battery including a storage block to define a deformation region which is deformable along a deformation path in the event of the crash and arranged in the deformation zone, said storage block comprised of a plurality of storage cells having electrically conductive terminals for connection with power supply lines of the vehicle, said terminals being arranged in the second zone.

2. The vehicle of claim 1, wherein the storage cells are electrochemical or galvanic storage cells.

3. The vehicle of claim 1, further comprising a deformable, flexible sheet-like envelope in surrounding relationship to the storage cells.

4. The vehicle of claim 1, wherein the storage cells in the storage block of the traction battery are spaced from each other to define deformation gaps there between.

5. The vehicle of claim 1, further comprising a battery housing accommodating the storage block in a gas-tight and liquid-tight manner.

6. The vehicle of claim 5, wherein the battery housing is made of deformable material.

7. The vehicle of claim 6, wherein the deformable material is a rubber-like sheath material.

8. The vehicle of claim 1, wherein the terminals of the traction battery are arranged on the traction battery on a side which faces away from a force introduction caused by the crash.

9. The vehicle of claim 1, further comprising a protective element arranged anteriorly of a side of the traction battery in facing relationship to a force introduction caused by the crash for force distribution or for protection against a sharp object.

10. The vehicle of claim 1, wherein the traction battery is arranged in a front region of the vehicle, said storage block being arranged anteriorly of the terminals of the traction battery, when viewed in a travel direction of the vehicle.

11. The vehicle of claim 10, wherein the terminals of the traction battery are arranged between suspension strut mounts in the front region of the vehicle.

12. The vehicle of claim 1, wherein the traction battery is arranged in a rear region of the vehicle, said terminals of the traction battery being arranged anteriorly of the storage block, when viewed in a travel direction of the vehicle.

\* \* \* \* \*